US012781557B2

(12) United States Patent
Bruchu et al.

(10) Patent No.: US 12,781,557 B2
(45) Date of Patent: Nov. 3, 2026

(54) ADJUSTABLE SELF-CLOSING DOOR HINGE AND DOOR SYSTEMS INCORPORATING THE HINGES

(71) Applicant: ANDERSEN CORPORATION, Bayport, MN (US)

(72) Inventors: Todd Bruchu, Lake Elmo, MN (US); Craig Johnson, North Oaks, MN (US)

(73) Assignee: Andersen Corporation, Bayport, MN (US)

( * ) Notice: Subject to any disclaimer, the term of this patent is extended or adjusted under 35 U.S.C. 154(b) by 346 days.

(21) Appl. No.: 18/385,953

(22) Filed: Nov. 1, 2023

(65) Prior Publication Data

US 2024/0254819 A1 Aug. 1, 2024

Related U.S. Application Data

(60) Provisional application No. 63/441,891, filed on Jan. 30, 2023.

(51) Int. Cl.
*E05F 1/10* (2006.01)

(52) U.S. Cl.
CPC ....... *E05F 1/1008* (2013.01); *E05Y 2900/132* (2013.01)

(58) Field of Classification Search
CPC ... E05F 1/1016; E05F 1/08; E05F 1/10; E05F 1/1008; E05D 7/04; E05D 7/0415; E05D 2007/0469; E05Y 2900/132
See application file for complete search history.

(56) References Cited

U.S. PATENT DOCUMENTS

| | | | | |
|---|---|---|---|---|
| 4,043,001 | A | 8/1977 | Parsons | |
| 4,073,038 | A | 2/1978 | Curry | |
| 5,152,029 | A * | 10/1992 | Pai | E05F 3/20 16/54 |
| 5,339,493 | A | 8/1994 | MacIntyre | |
| 5,694,665 | A | 12/1997 | Strickland et al. | |
| 5,799,370 | A | 9/1998 | Davidian et al. | |
| 8,429,794 | B2 | 4/2013 | Tagtow et al. | |
| 8,490,246 | B2 | 7/2013 | Waddell | |
| 9,617,772 | B1 * | 4/2017 | Chen | E05F 1/1016 |
| 9,803,408 | B2 | 10/2017 | Timothy | |
| 10,280,669 | B2 * | 5/2019 | Grewe | E05F 1/1016 |
| 11,041,335 | B2 * | 6/2021 | Chen | E05F 1/1215 |
| 2011/0296652 | A1 * | 12/2011 | Zhang | E05D 7/0423 16/239 |
| 2013/0205543 | A1 * | 8/2013 | Chen | E05F 1/1215 16/301 |
| 2013/0247329 | A1 * | 9/2013 | Teta | E05F 1/006 16/48.5 |

(Continued)

FOREIGN PATENT DOCUMENTS

| | | | | |
|---|---|---|---|---|
| EP | 2312105 A | | 4/2011 | |
| KR | 20110007986 U | * | 8/2011 | E05D 7/0423 |
| KR | 20160042722 A | * | 4/2016 | E05D 7/12 |

OTHER PUBLICATIONS

English translation of KR20160042722 (Year: 2016).*

(Continued)

*Primary Examiner* — Emily M Morgan
(74) *Attorney, Agent, or Firm* — Mueting Raasch Group

(57) ABSTRACT

Self-closing door hinges with vertical adjustment, door systems incorporating the hinges, and related methods are described herein.

27 Claims, 9 Drawing Sheets

(56) References Cited

U.S. PATENT DOCUMENTS

| | | | | |
|---|---|---|---|---|
| 2019/0106920 | A1* | 4/2019 | Grewe | E05F 1/1016 |
| 2019/0145141 | A1* | 5/2019 | Jo | E05F 3/20<br>16/54 |
| 2021/0207417 | A1* | 7/2021 | Koo | E05F 1/1215 |

OTHER PUBLICATIONS

English translation of KR20110007986 (Year: 2011).*

"Cornerstone 2 Fully Adjustable Hinge" Product page [online]. Nationwide Industries, available as early as May 19, 2022, retrieved Jun. 4, 2024, from <https://nationwideindustries.com/product/cornerstone-2-fully-adjustable-hinge/>, 3 pages.

* cited by examiner

ADJUSTABLE SELF-CLOSING DOOR HINGE AND DOOR SYSTEMS INCORPORATING THE HINGES

RELATED APPLICATION

The present application claims the benefit under 35 U.S.C. § 119(e) of U.S. Provisional Patent Application 63/441,891 filed on Jan. 30, 2023, which is hereby incorporated by reference in its entirety.

Self-closing door hinges with vertical adjustment, door systems incorporating the hinges, and related methods are described herein.

Self-closing door hinges are used in many applications in which automatic closing of doors is desirable and/or required by building codes for, e.g., fire doors, entry doors, etc. U.S. Pat. Nos. 4,043,001 and 4,073,038 describe two different self-closing hinge designs.

SUMMARY

Self-closing door hinges with vertical adjustment, door systems incorporating the hinges, and related methods are described herein.

Although self-closing door hinges are a convenient approach to providing self-closing doors, self-closing door hinges do not provide for vertical adjustment of a door panel relative to the frame in which door panel is located. The lack of vertical adjustment can typically be addressed by vertical adjustments in the threshold and/or weatherstripping/sweep attached to the door panel. Vertical adjustments to the threshold may, however, not be possible where, for example, increased water performance and/or decreased threshold height are needed or desired.

The vertically adjustable self-closing hinges described herein can, in one or more embodiments, be used to replace vertical adjustment of threshold height beneath a door panel.

In one aspect, one or more embodiments of a self-closing hinge assembly as described herein include: a first leaf configured to be attached to a first door system surface; a second leaf configured to be attached to a second door system surface; a first knuckle and a second knuckle, wherein the first knuckle and the second knuckle are attached to the first leaf and are aligned with each other along a hinge axis extending through the first knuckle and the second knuckle, and wherein the first knuckle and the second knuckle are spaced apart from each other along the hinge axis; a central knuckle located between the first knuckle and the second knuckle, wherein the central knuckle is attached to the second leaf and aligned with the first knuckle and the second knuckle along the hinge axis; a ratchet plug located in the first knuckle, the ratchet plug fixed in position relative to the first knuckle and the hinge axis, and wherein the ratchet plug comprises ratchet features facing the central knuckle; a torsion spring located in the central knuckle, wherein the torsion spring comprises a first end proximate the first knuckle and a second end proximate the second knuckle; a first spindle located between the first end of the torsion spring and the ratchet plug, wherein the first spindle comprises a spring end engaged with the first end of the torsion spring such that rotation of the first spindle about the hinge axis rotates the first end of the torsion spring about the hinge axis, and wherein the first spindle comprises a ratchet portion located in the first knuckle; a biasing element located between the first end of the torsion spring and the ratchet portion of the first spindle, wherein the biasing element is configured to force the ratchet portion of the first spindle into engagement with the ratchet features on the ratchet plug, wherein the ratchet features of the ratchet plug and the ratchet portion of the first spindle, when engaged with each other, are configured to allow the first spindle to rotate about the hinge axis in one direction and to prevent rotation of the first spindle about the hinge axis in a direction opposite the one direction; a screw located in the second knuckle, wherein the second knuckle and the screw comprise complementary threads such that rotation of the screw in a first direction about the hinge axis moves the screw along the hinge axis towards the first knuckle, and wherein rotation of the screw about the hinge axis in a second direction opposite the first direction moves the screw along the hinge axis away from the first knuckle; and a second spindle extending between the second end of the torsion spring and the screw, wherein the second spindle comprises a spring end located in the central knuckle and engaged with the second end of the torsion spring, and wherein the second spindle is fixed in position in the central knuckle relative to the hinge axis such that rotation of the second leaf in the second direction about the hinge axis relative to the first leaf acts against the torsion force applied to the second leaf of the hinge assembly by the torsion spring; wherein rotation of the screw about the hinge axis in the first direction moves the second leaf along the hinge axis towards the first knuckle, and wherein rotation of the screw about the hinge axis in the second direction moves the second leaf along the hinge axis away from the first knuckle.

In one or more embodiments of the self-closing hinge assemblies described herein, rotation of the screw about the hinge axis in the first direction moves the second spindle and the second end of the torsion spring along the hinge axis towards the first knuckle.

In one or more embodiments of the self-closing hinge assemblies described herein, rotation of the first spindle about the hinge axis in the one direction increases a torque force applied by the torsion spring to the second leaf.

In one or more embodiments of the self-closing hinge assemblies described herein, the torsion spring comprises helical windings and a leg extending inward from the helical windings at the first end of the torsion spring, and wherein the first spindle comprises a slot configured to capture the leg such that rotation of the first spindle about the hinge axis in the one direction increases a torque force applied by the torsion spring to the second leaf. In one or more embodiments, the slot comprises a depth extending along the hinge axis, and wherein rotation of the screw about the hinge axis in the first direction moves the leg of the torsion spring within the slot towards the first knuckle.

In one or more embodiments of the self-closing hinge assemblies described herein, rotation of the screw about the hinge axis in the first direction moves the torsion spring towards the first knuckle.

In one or more embodiments of the self-closing hinge assemblies described herein, rotation of the first spindle about the hinge axis in the one direction compresses the biasing element along the hinge axis and moves the ratchet portion of the first spindle away from the ratchet plug.

In one or more embodiments of the self-closing hinge assemblies described herein, the biasing element comprises a helically wound compression spring. In one or more embodiments, the biasing element is attached to the first spindle.

In one or more embodiments of the self-closing hinge assemblies described herein, the assembly comprises a shoulder on the first spindle, wherein the biasing element acts on the shoulder to force the ratchet portion into engagement with the ratchet features on the ratchet plug.

In one or more embodiments of the self-closing hinge assemblies described herein, the first spindle comprises a slot extending about a portion of the circumference of the first spindle proximate the ratchet portion of the first spindle, and wherein the first knuckle comprises a pin extending radially inward through the first knuckle into the slot, whereby rotation of the first spindle in the one direction is limited by a circumferential length of the slot. In one or more embodiments, the slot comprises a slot height measured along the hinge axis, and wherein the slot height is two or more times a pin height of the pin measured along the hinge axis.

In one or more embodiments of the self-closing hinge assemblies described herein, the second spindle comprises a stud extending away from the torsion spring along the hinge axis and wherein the screw comprises a stud cavity, wherein the pin is located in the stud cavity and wherein the pin rotates about the hinge axis within the stud cavity when the second leaf rotates about the hinge axis.

In a second aspect, one or more embodiments of a self-closing hinge assembly as described herein include: a first leaf configured to be attached to a first door system surface; a second leaf configured to be attached to a second door system surface; a first knuckle and a second knuckle, wherein the first knuckle and the second knuckle are attached to the first leaf and are aligned with each other along a hinge axis extending through the first knuckle and the second knuckle, and wherein the first knuckle and the second knuckle are spaced apart from each other along the hinge axis; a central knuckle located between the first knuckle and the second knuckle, wherein the central knuckle is attached to the second leaf and aligned with the first knuckle and the second knuckle along the hinge axis; a ratchet plug located in the first knuckle, the ratchet plug fixed in position relative to the first knuckle and the hinge axis, and wherein the ratchet plug comprises ratchet features facing the central knuckle; a torsion spring located in the central knuckle, wherein the torsion spring comprises a first end proximate the first knuckle and a second end proximate the second knuckle; a first spindle located between the first end of the torsion spring and the ratchet plug, wherein the first spindle comprises a spring end engaged with the first end of the torsion spring such that rotation of the first spindle about the hinge axis rotates the first end of the torsion spring about the hinge axis, and wherein the first spindle comprises a ratchet portion located in the first knuckle; a biasing element located between the first end of the torsion spring and the ratchet portion of the first spindle, wherein the biasing element is configured to force the ratchet portion of the first spindle into engagement with the ratchet features on the ratchet plug, wherein the ratchet features of the ratchet plug and the ratchet portion of the first spindle, when engaged with each other, are configured to allow the first spindle to rotate about the hinge axis in one direction and to prevent rotation of the first spindle about the hinge axis in a direction opposite the one direction; a screw located in the second knuckle, wherein the second knuckle and the screw comprise complementary threads such that rotation of the screw in a first direction about the hinge axis moves the screw along the hinge axis towards the first knuckle, and wherein rotation of the screw about the hinge axis in a second direction opposite the first direction moves the screw along the hinge axis away from the first knuckle; and a second spindle extending between the second end of the torsion spring and the screw, wherein the second spindle comprises a spring end located in the central knuckle and engaged with the second end of the torsion spring, and wherein the second spindle is fixed in position in the central knuckle relative to the hinge axis such that rotation of the second leaf in the second direction about the hinge axis relative to the first leaf acts against the torsion force applied to the second leaf of the hinge assembly by the torsion spring; wherein rotation of the screw about the hinge axis in the first direction moves the second leaf along the hinge axis towards the first knuckle, and moves the second spindle and the second end of the torsion spring along the hinge axis towards the first knuckle; wherein the torsion spring comprises helical windings and a leg extending inward from the helical windings at the first end of the torsion spring, and wherein the first spindle comprises a slot configured to capture the leg such that rotation of the first spindle about the hinge axis in the one direction increases a torque force applied by the torsion spring to the second leaf, wherein the slot comprises a depth extending along the hinge axis, and wherein rotation of the screw about the hinge axis in the first direction moves the leg of the torsion spring within the slot towards the first knuckle.

In one or more embodiments of the second aspect of self-closing hinge assemblies described herein, rotation of the first spindle about the hinge axis in the one direction compresses the biasing element along the hinge axis and moves the ratchet portion of the first spindle away from the ratchet plug.

In one or more embodiments of the second aspect of self-closing hinge assemblies described herein, the biasing element comprises a helically wound compression spring attached to the first spindle.

In one or more embodiments of the second aspect of self-closing hinge assemblies described herein, the assembly comprises a shoulder on the first spindle, wherein the biasing element acts on the shoulder to force the ratchet portion into engagement with the ratchet features on the ratchet plug.

In one or more embodiments of the second aspect of self-closing hinge assemblies described herein, the first spindle comprises a slot extending about a portion of the circumference of the first spindle proximate the ratchet portion of the first spindle, and wherein the first knuckle comprises a pin extending radially inward through the first knuckle into the slot, whereby rotation of the first spindle in the one direction is limited by a circumferential length of the slot. In one or more embodiments, the slot comprises a slot height measured along the hinge axis, and wherein the slot height is two or more times a pin height of the pin measured along the hinge axis.

In one or more embodiments of the second aspect of self-closing hinge assemblies described herein, the second spindle comprises a pin extending away from the torsion spring along the hinge axis and wherein the screw comprises a stud cavity, wherein the pin is located in the stud cavity and wherein the pin rotates about the hinge axis within the stud cavity when the second leaf rotates about the hinge axis.

In one or more embodiments of the self-closing hinge assemblies described herein, the assembly comprises a cover positioned over the central knuckle, wherein the central knuckle is configured to move along the hinge axis within the cover.

Where used herein, positional terms such as “top,” “bottom,” “above,” “below,” etc. are used for reference relative to each other when the fenestration units including one or self-closing hinges are installed in a building opening. These terms should not be construed narrowly and may, in actual use, be reversed. For example, a first component described as being above a second component may, in actual use, be located below the second component. Furthermore, in one or more embodiments, components described as, e.g., side jambs, head jambs, sills, etc. may be found in any orientation of the fenestration units described herein. For example, components described as a side jamb may, in one or more embodiments, be found at the top or bottom of a fenestration unit as installed while the head jamb and still of the fenestration unit are found on the sides of the fenestration unit as installed. Such relational terms are used only out of convenience and should not be construed as limiting the claims.

Where used herein, the terms "exterior" and "interior" are used in a relative sense, for example, an exterior surface and an interior surface may be used to describe surfaces located on opposite sides of a fenestration unit. In actual use, and exterior surface could be found within the interior of a building or other structure where the surface would conventionally be defined as an interior surface, while an interior surface could be found outside of a building or other structure where the surface would conventionally be defined as an exterior surface.

As used herein and in the appended claims, the singular forms "a," "an," and "the" include plural referents unless the context clearly dictates otherwise. Thus, for example, reference to "a" or "the" component may include one or more of the components and equivalents thereof known to those skilled in the art. Further, the term "and/or" means one or all of the listed elements or a combination of any two or more of the listed elements.

It is noted that the term "comprises" and variations thereof do not have a limiting meaning where these terms appear in the accompanying description. Moreover, "a," "an," "the," "at least one," and "one or more" are used interchangeably herein.

The above summary is not intended to describe each embodiment or every implementation of the self-closing door hinges, door systems incorporating the hinges, and related methods as described herein. Rather, a more complete understanding of the invention will become apparent and appreciated by reference to the following Description of Illustrative Embodiments and claims in view of the accompanying figures of the drawing.

DESCRIPTION OF ILLUSTRATIVE EMBODIMENTS

Figure 1:
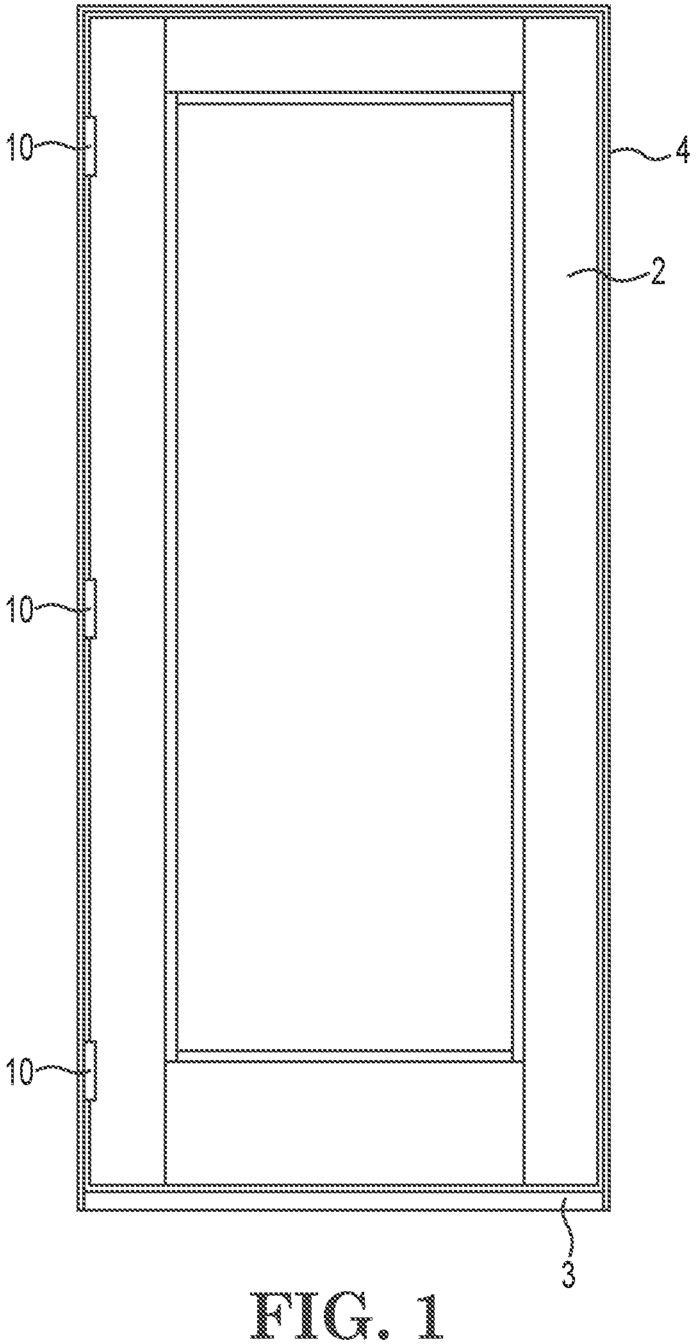
FIG. 1 depicts one illustrative embodiment of a door system including one or more self-closing hinges as described herein.

In the following description of illustrative embodiments, reference is made to the accompanying figures of the drawing which form a part hereof, and in which are shown, by way of illustration, specific embodiments. It is to be understood that other embodiments may be utilized and structural changes may be made without departing from the scope of the present invention.

FIG. 1 depicts one illustrative embodiment of a door system including one or more self-closing hinges 10 as described herein. The door system includes a door panel 2 contained within a frame for above a threshold or sill 3. The depicted door system includes three hinges 10 although it should be understood that door systems may include as few as one self-closing hinge if a single self-closing hinge provide sufficient closing force to the door panel 2.

Figure 2:
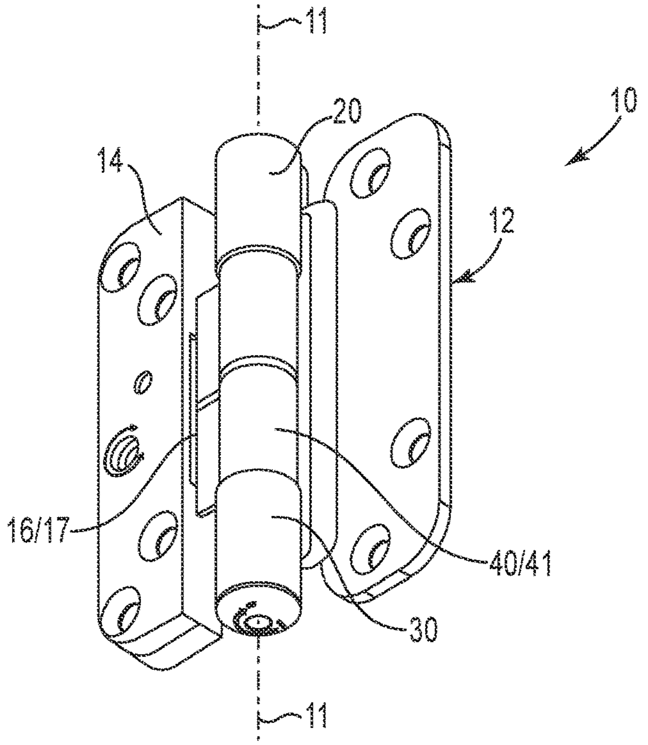
FIG. 2 is a bottom-right perspective view of one illustrative embodiment of a self-closing door hinge as described herein.
Figure 3:
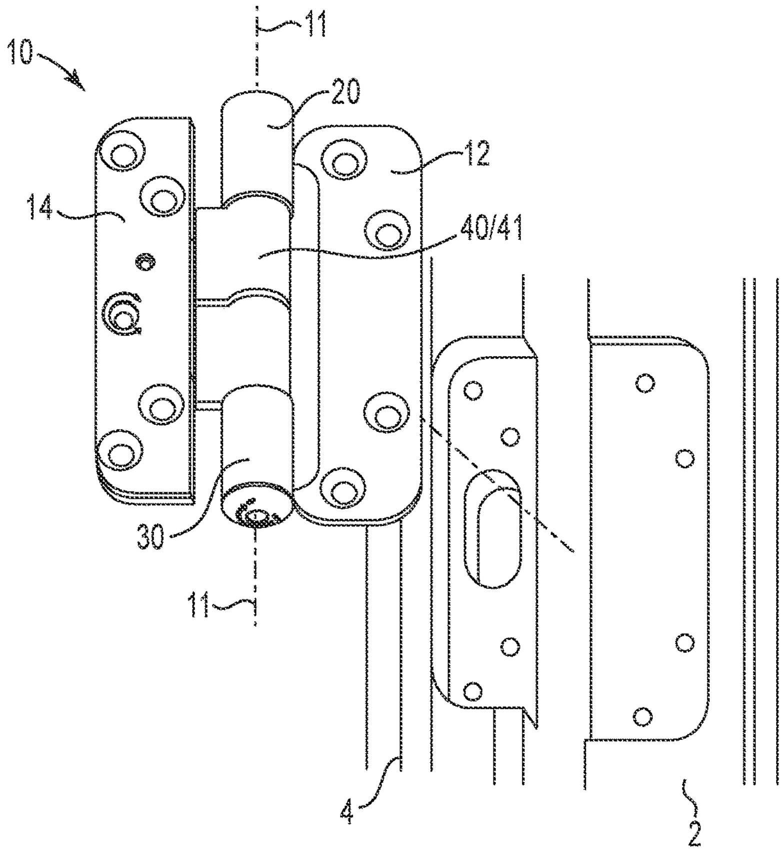
FIG. 3 is a perspective view of the door hinge of FIG. 2 before attachment to a door frame and door panel as described herein.
Figure 4:
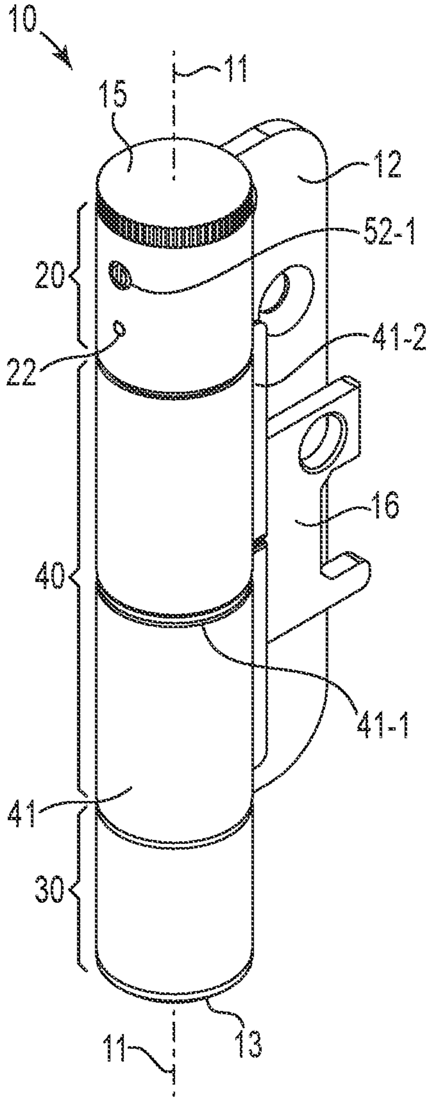
FIG. 4 is a top-left perspective view of one illustrative embodiment of a self-closing door hinge as described herein after removal of a receiver configured to receive the second leaf of the door hinge.
Figure 5:
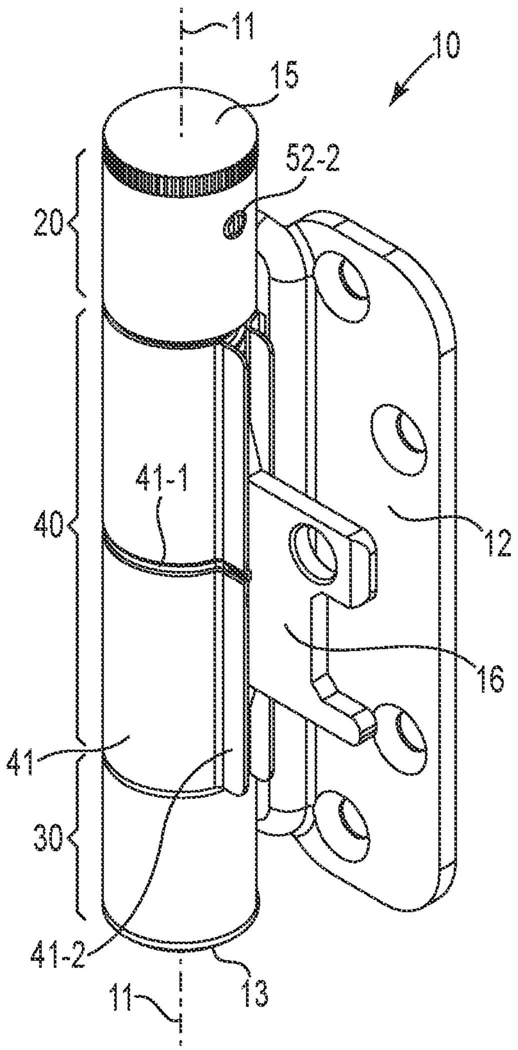
FIG. 5 is a top-right perspective view of the self-closing door hinge of FIG. 4.
Figure 6:
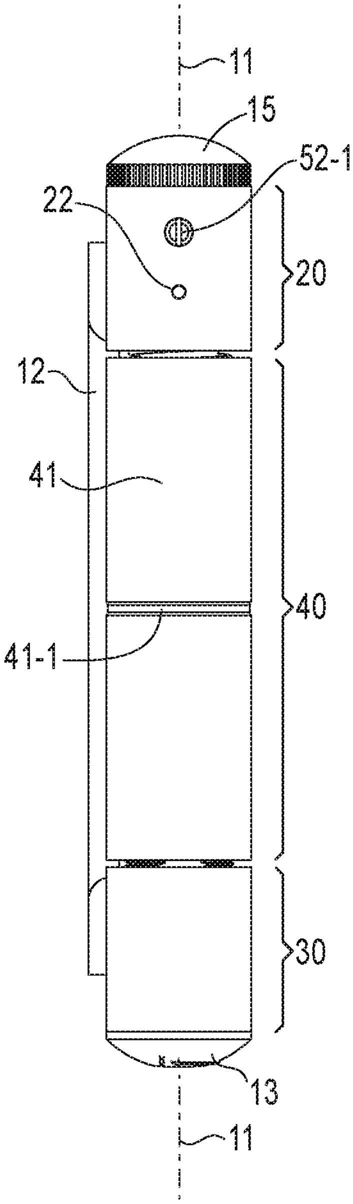
FIG. 6 is a left side view of the self-closing door hinge of FIGS. 4-5.
Figure 7:
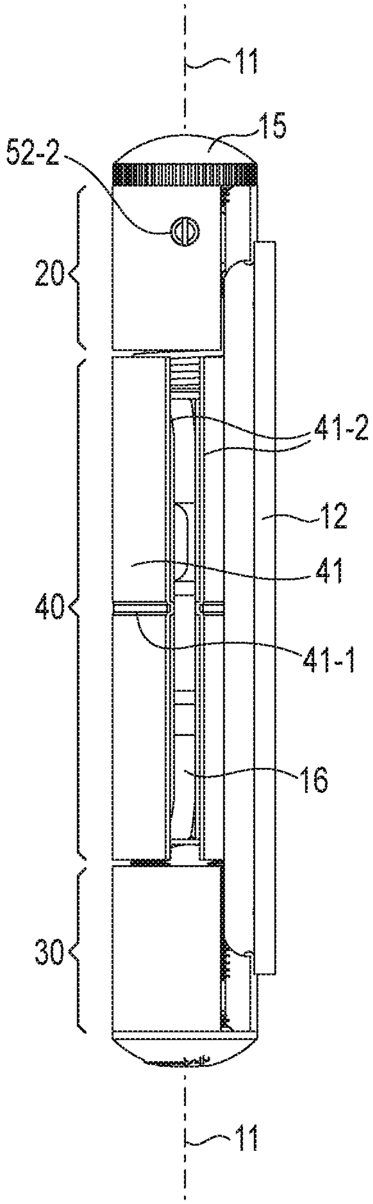
FIG. 7 is a right side view of the self-closing door hinge of FIGS. 4-6.

FIG. 2 is a bottom-right perspective view of one illustrative embodiment of a self-closing door hinge 10 in isolation from the door system depicted in FIG. 1 and FIG. 3 is a perspective view of the door hinge of FIG. 2 before attachment to a door frame 4 and door panel 2 as described herein. The hinge 10 includes leaves that rotate about hinge axis 11. Hinge axis 11 extends through upper knuckle 20 and lower knuckle 30 as well as central knuckle 40 which, in the depicted embodiment includes a cover 41 over the working components of central knuckle 40 for aesthetics. First leaf 12 is connected to upper and lower knuckles 20 and 30. The second leaf 16 is connected to central knuckle 40 and is largely hidden because it is located within a pocket 17 formed within receiver 14.

Although receiver 14 and leaf 16 contained within pocket 17 of receiver 14 are depicted as being attached to the door panel 2 while leaf 12 is attached to the frame 4, in one or more alternative embodiments, the attachment may be reversed, i.e., the receiver 14 and leaf 16 contained within pocket 17 of receiver 14 may be attached to the door panel 2 while the leaf 12 is attached to the frame 4 (to, e.g., a hinge side jamb).

Receiver 14 and leaf 16 of hinge 10 also provide for horizontal adjustment of the door panel 2 within a frame. Horizontal adjustment of a door panel within a frame is, however, known and will not be described further herein.

The self-closing door hinge 10 of FIGS. 2-3 is depicted in various views in FIGS. 4-9 with the receiver 14 removed to expose leaf 16 attached to central knuckle 40 located in cover 41. Door hinge 10 includes a lower end cap 13 attached to the hinge proximate lower knuckle 30 as well as an upper end cap 15 attached to the hinge proximate the upper knuckle 20. These components are optional and provided for aesthetic purposes and/or to protect the inner components of hinge 10 from tampering, dust or other debris. The end caps 13 and 15 may be connected to their respective knuckles using any suitable technique or combination of techniques including, but not limited to, threading, friction fit, adhesives, magnets, etc.

Also depicted in FIGS. 4-7 are various setscrews and pins used in the depicted illustrative embodiment of a self-closing hinge. In particular, setscrews 52-1 and 52-2 in upper knuckle 20 as well as pin 22 are seen in FIGS. 4-7. These components will be described in more detail in connection with other figures.

Figure 9:
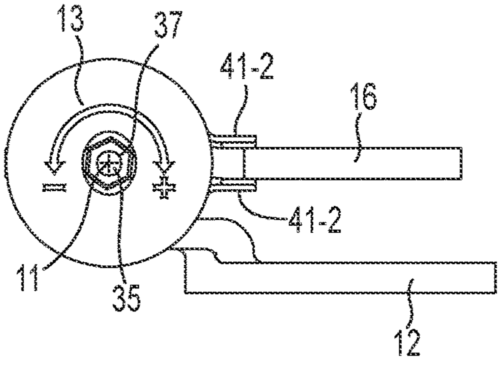
FIG. 9 is a bottom view of the self-closing door hinge of FIGS. 4-8.

FIG. 9 is a view of end cap 13 which includes an opening 37 through which access to a tool cavity 35 in a spindle located within the knuckle 30 is visible. The tool cavity 35 can be used for vertical adjustment of the leaf 16 along the hinge axis 11 as described herein. The depicted end cap 13 includes optional indicia to provide a user with information regarding the direction to rotate a tool inserted into the tool cavity 35 to raise or lower the leaf 16 along hinge axis 11.

Figure 8:
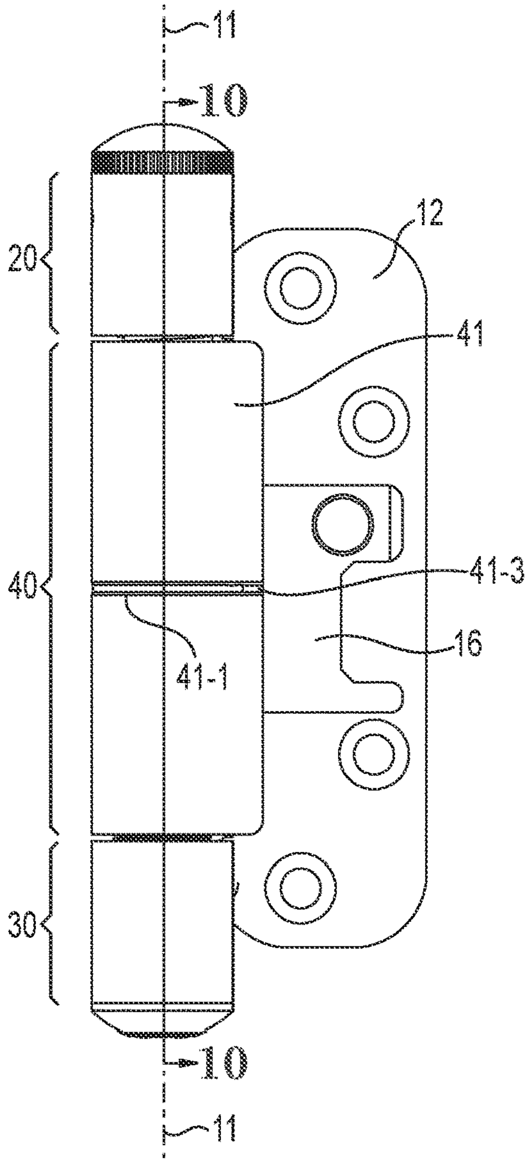
FIG. 8 is front view of the self-closing door hinge of FIGS. 4-7.
Figure 10:
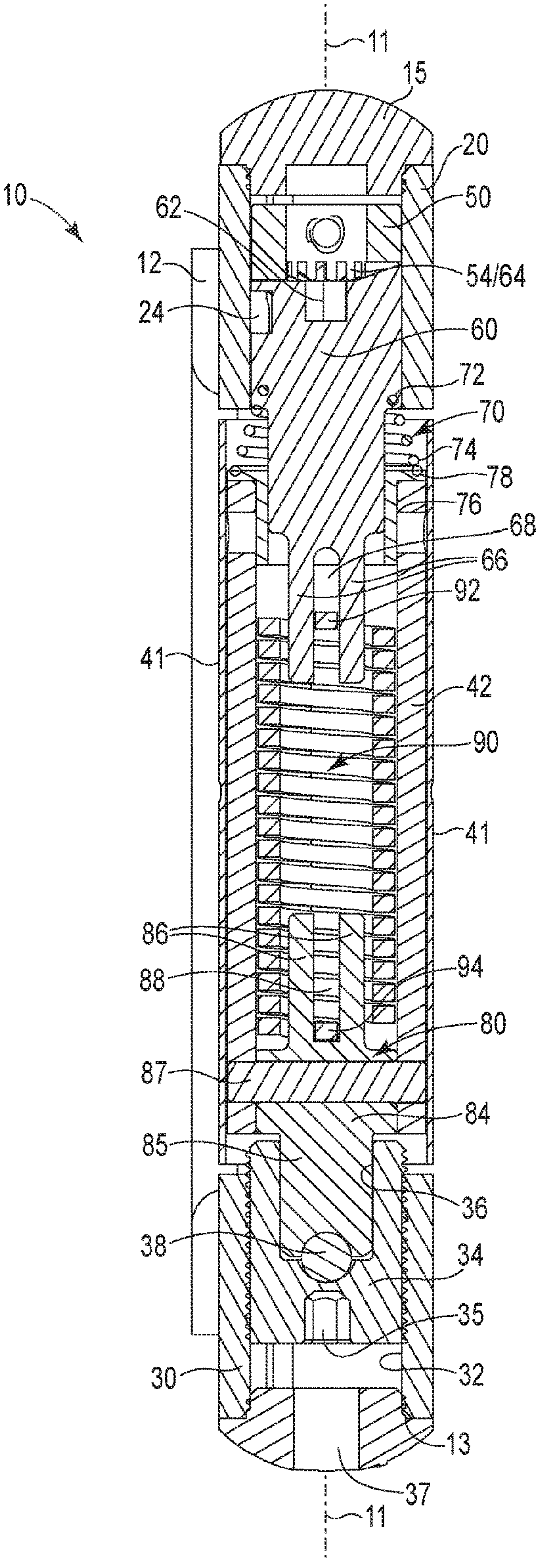
FIG. 10 is an enlarged cross-sectional view of the self-closing door hinge of FIG. 8 taken along line 10-10 in FIG. 8.
Figure 14:
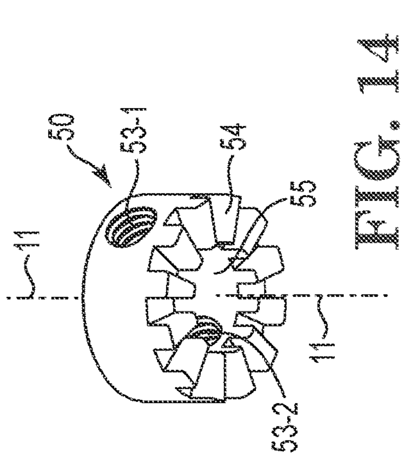
FIG. 14 is an isolated perspective view of the ratchet plug depicted in FIG. 13.
Figure 15:
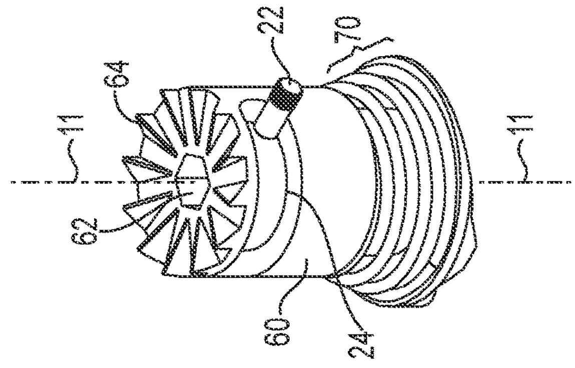
FIG. 15 is an isolated perspective view of a portion of a first spindle located above the central knuckle as depicted in FIG. 11.
Figure 13:
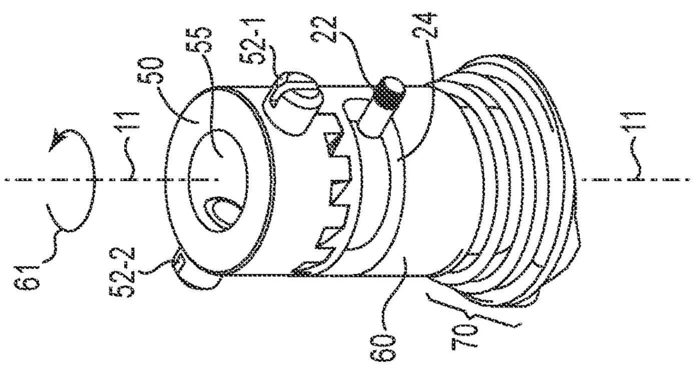
FIG. 13 is a perspective view of the ratchet components used to increase the closing force of the self-closing hinge FIGS. 4-12 as described herein.
Figure 11:
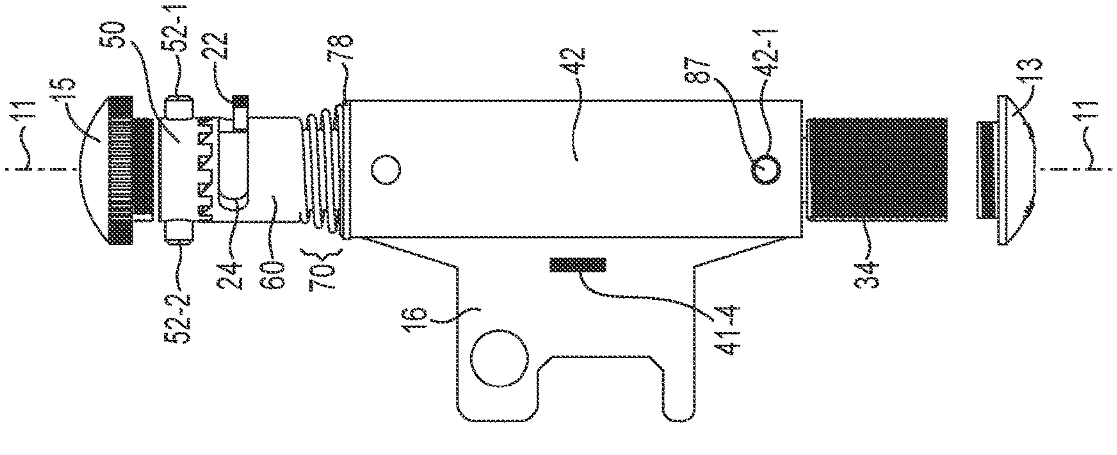
FIG. 11 is a rearview of the self-closing door hinge depicted in FIG. 8 with the frame leaf 12 and attached knuckles 20 and 30 along with central knuckle 41 removed to expose components within the hinge.

The internal components of the depicted illustrative embodiment of self-closing hinge 10 will be described in connection with FIGS. 10-12. FIG. 10 is an enlarged cross-sectional view of the self-closing door hinge of FIG. 8 taken along line 10-10 in FIG. 8, FIG. 11 is a rearview of the self-closing door hinge depicted in FIG. 8 with the frame leaf 12 (including attached knuckles 20 and 30) and central knuckle cover 41 removed to expose components within the hinge, and FIG. 12 is an exploded view of the components of the self-closing door hinge.

Figure 12:
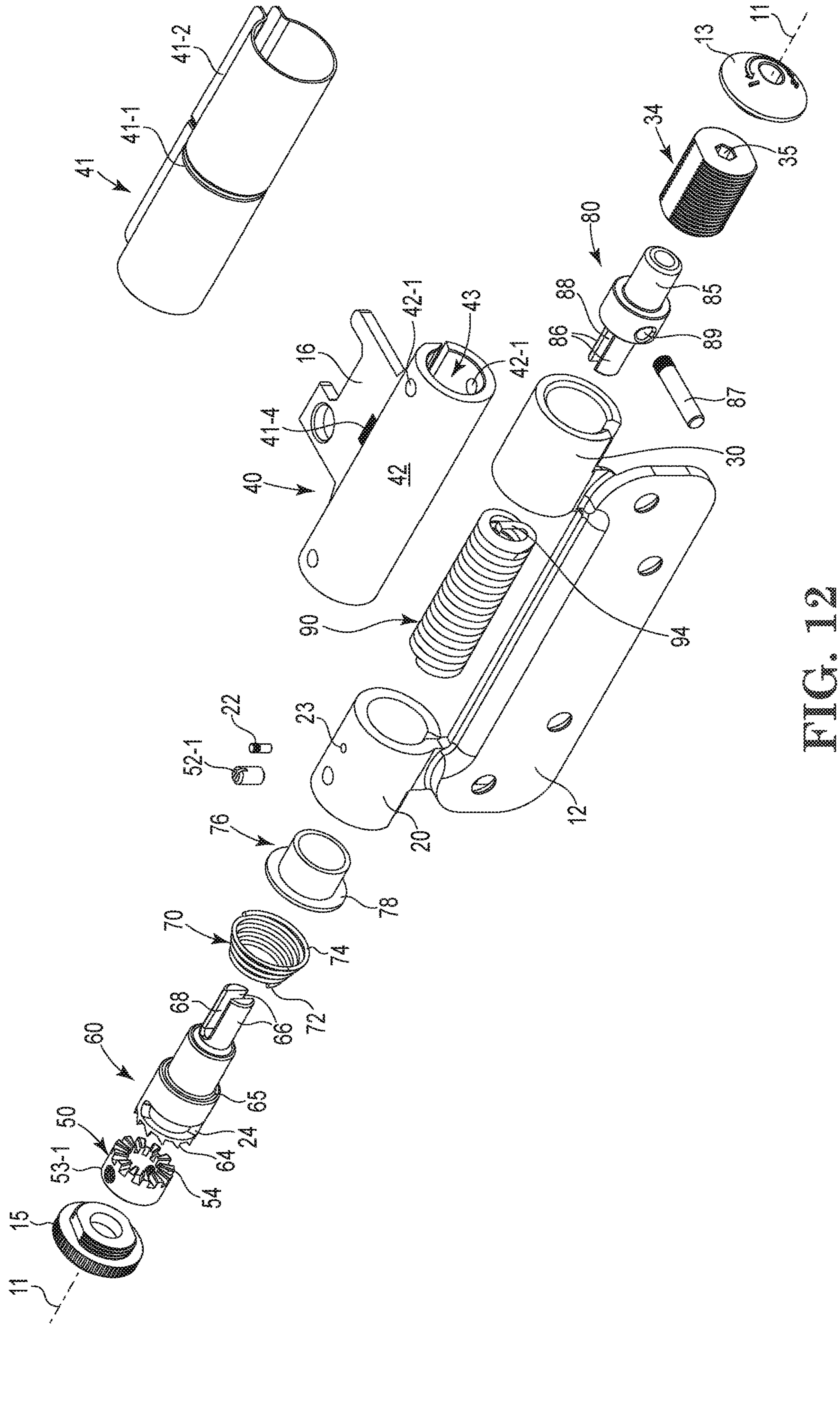
FIG. 12 is an exploded view of components of the self-closing door hinge of FIGS. 4-11.

With reference to FIGS. 10 and 12, the knuckle 20 (attached to leaf 12 of hinge 10) includes end cap 15 positioned over ratchet plug 50 located within knuckle 20. Ratchet plug 50 is fixed in position within knuckle 20 using setscrews 52-1 and 52-2 that are received in the set screw openings 53-1 and 53-2 in ratchet plug 50 (see, e.g., FIGS. 4-7 and 11-14). Being fixed in position, ratchet plug 50 does not move along the hinge axis 11 nor does it rotate about hinge axis 11.

Moving further down along hinge axis 11 of hinge 10, spindle 60 is located below ratchet plug 50, with only a portion of spindle 60 located within knuckle 20.

Spindle 60 extends through biasing element 70 and into bushing 76 positioned within the barrel 42 of central knuckle 40. Bushing 76 also provides a shoulder 78 against which biasing element 70 acts to urge spindle 60 into contact with the ratchet plug 50.

Barrel 42 of central knuckle 40 is located within central knuckle cover 41 (noting that cover 41 is removed from FIG. 11) and contains torsion spring 90 as well as a portion of spindle 60. Leaf 16 is attached to the barrel 42 of central knuckle 40 such that rotation of the leaf 16 about the hinge axis 11 is transferred to the barrel 42 and rotation of the barrel 42 about the hinge axis 11 is transferred to the leaf 16.

As discussed herein, the barrel 42 of central knuckle 40 is optionally contained within a cover 41 for aesthetics. The cover 41 may optionally include, e.g., a channel 41-1 to simulate the junction between a pair of knuckles in a hinge that is not a self-closing hinge.

Moving still further down along hinge axis 11, a portion of spindle 80 at the opposite end of the barrel 42 and torsion spring 90 extends into the barrel 42 of central knuckle 40 with spindle 80 including a stud 85 extending downward into a stud cavity 36 (see FIG. 10) in screw 34 contained within knuckle 30.

Spindle 80 is fixed in position within barrel 42 such that the spindle 80 does not move along or about the hinge axis 11 relative to the barrel 42. In the depicted embodiment, spindle 80 is fixed in barrel 42 by pin 87 that extends through aperture 89 in spindle 80 as well as apertures 42-1 in barrel 42.

As discussed herein, screw 34 and the interior surface 32 of knuckle 30 are threaded such that rotation of screw 34 about the hinge axis 11 in a first direction moves the screw 34 towards the first knuckle 20 while rotation of screw 34 about the hinge axis 11 in a second direction opposite the first direction moves the screw 34 away from the first knuckle 20. Movement of screw 34 towards and away from the first knuckle 20 provides the vertical adjustability in self-closing hinges as described herein.

Moving still further along hinge axis 11, end cap 13 is attached to knuckle 30 and includes opening 37 to provide access to tool cavity 35 located in screw 34, with a tool such as, e.g., an Allen wrench being inserted through opening 37 into tool cavity 35 to rotate screw 34.

In the depicted illustrative embodiment (as seen in FIG. 10), an optional ball bearing 38 is provided in the stud cavity 36 of screw 34 such that stud 85 rotates on ball bearing 38 to facilitate rotation of knuckle 40 and its attached leaf 16 during operation of hinge 10.

Moving upward back through hinge 10, torsion spring 90 located within barrel 42 can be described as having one end proximate spindle 80 and an opposite end proximate spindle 60. The torsion spring 90 may be manufactured of any suitable materials as long as the spring 90 meets industry requirements for, e.g., closing force, open/close cycles, etc.

The depicted illustrative embodiment of torsion spring 90 includes a leg 94 extending inward towards the hinge axis 11 from the helical coils that make up torsion spring 90. As described herein, spindle 80 is engaged with the end of torsion spring 90, in particular, the leg 94 at the end of torsion spring 90. In the depicted illustrative embodiment, spindle 80 includes a slot 88 in which leg 94 is captured, with the slot 88 being located between arms 86 extending further into the central portion of torsion spring 90. The engagement between arms 86 of spindle 80 and the leg 94 of torsion spring 90 prevents relative rotation between the torsion spring 90 and spindle 80 about hinge axis 11.

Further, because spindle 80 is fixed in position in barrel 42 (by pin 87 in the depicted illustrative embodiment) any movement of spindle 80 along or about the hinge axis 11 is transferred to the leg 94 of spring 90, while any rotation of barrel 42 (and leaf 16) about hinge axis 11 is transferred to the spindle 80 and the leg 94 of the torsion spring 90.

At the opposite end of torsion spring 90, spindle 60 includes arms 66 that extend into the interior of torsion spring 90 and capture a leg 92 extending inward towards the hinge axis 11 from the helical coils that make up torsion spring 90. The engagement between arms 66 of spindle 60 and the leg 92 of torsion spring 90 prevents relative rotation between the leg 92 of torsion spring 90 and spindle 60 about hinge axis 11.

These actions provide the force required to close a door panel to which the hinge 10 is attached. In other words, as the door panel is rotated about hinge axis 11, the leaf 16 and barrel 42 are also rotated about the hinge axis 11 which, in turn, rotates the leg 94 of spring 90 captured in spindle 80. The leg 92 at the opposite end of the spring 90 is, however, captured such that it cannot rotate with the barrel 42 as the door panel opens. The rotation of leg 94 by barrel 42/spindle 80 while the leg 92 is prevented from rotating by spindle 60 (which cannot rotate in the "opening" direction due to stationary ratch plug 50 and teeth 54/64) increases the winding tension within the spring 90 as the door panel is opened, and that tension in spring 90 is released as the door panel and leaf 16/barrel 42 rotate back in the opposite direction as, e.g., the door panel closes. It is preferred that the tension in the spring 90 is sufficient to close the door panel. If it is not, then the preload tension in the spring can be increased by rotating spindle 60 relative to rachet plug 50 as described herein.

Vertical adjustment of the leaf 16 using screw 34 in knuckle 30 is accommodated at spindle 60 by the slot 68 of spindle 60. In particular, as screw 34 is rotated to move spindle 80 towards knuckle 20 at the opposite end of the hinge, leg 92 of torsion spring 90 moves within slot 68 towards the main portion of spindle 60 while still remaining captured within the arms 66 of spindle 60. As a result movement of the torsion spring 90 towards knuckle 20 is accommodated by the spindle 60 and associated components.

Spindle 60 does not, however, rotate within knuckle 20 due to rotation of the barrel 42 of central knuckle 40 and the attached leaf 16 during opening or closing of a door panel attached to the hinge 10 due to interference between the ratchet features on ratchet plug 50 and the ratchet portion on spindle 60 facing the ratchet plug 50. The ratchet features on ratchet plug 50 are depicted in FIGS. 11-15 are in the form of teeth 54 on ratchet plug 50 that extend towards the spindle 60 to mate with teeth 64 on the ratchet portion of spindle 60. The ramped surfaces on teeth 64 allow for rotation of spindle 60 relative to ratchet plug 50 in one direction while the more vertical surfaces of teeth 64 prevents rotation of spindle 60 relative to ratchet plug 50 in the opposite direction. Because the ratchet plug 50 is fixed in position within knuckle 20, rotation of the spindle 60 about the hinge axis 11 is allowed in one direction (in which preload tension is increased) and prevented in the opposite direction (in which preload tension is decreased).

Rotation of spindle 60 relative to ratchet plug 50 and the knuckle 20 in the direction allowed by the ratchet components can be used to preload or increase the torque force provided by torsion spring 90 to the hinge 10.

In one or more embodiments, the self-closing hinges described herein include a biasing element 70 located between an end of the torsion spring 90 and the spindle 60, with the biasing element 70 forcing the spindle 60 and its ratchet portion (i.e., teeth 64) into engagement with the ratchet features on the ratchet plug 50. When engaged with each other, the ratchet components on spindle 60 and ratchet plug 50 allow rotation of spindle 60 about the hinge axis 11 in one direction and prevents rotation of the spindle 60 about the hinge axis 11 in a direction opposite the allowed direction. Rotation of the spindle 60 about the hinge axis 11 to increase preload on the torsion spring 90 compresses the biasing element 70 along the hinge axis 11 as the ratchet portion of the spindle 60 moves away from the ratchet plug 50 because the teeth 54/64 force the spindle 60 towards the knuckle 30 against the biasing force of the biasing element 70. Any such transitory compression of biasing element 70 is, however, reversed when the teeth 54/64 settle into engagement with each other.

Biasing element 70 is, in the depicted embodiment, in the form of a compression spring having an upper end 72 acting on a shoulder 65 of spindle 60 and a lower end 74 extending around the circumference of the spindle 60. The lower end 74 of compression spring 70 acts, in the depicted illustrative embodiment, on a shoulder 78 provided on bushing 76 in which spindle 60 rotates during preloading of the torsion spring 90.

Although the depicted illustrative embodiment of hinge 10 includes a biasing element 70 in the form of a compression spring, other biasing mechanisms could be used in place of compression spring 70 including, for example, leaf springs, wave washers, spring washers, elastically resilient members (e.g., bushings, etc.), magnets, etc. The compression spring used as biasing element 70 provides a convenient and economical structure for providing the necessary biasing force needed to ensure engagement between the ratchet features on spindle 60 and the ratchet features on ratchet plug 50.

Because spindle 60 can move away from ratchet plug 50 along hinge axis 11, a user may be able to, if needed, reduce or even eliminate the preload tension provided by the torsion spring 90 by inserting a tool or other object into the tool cavity 62 of spindle 60 and rotating the spindle 60 (and, therefore, the leg 92 of spring 90) in a direction opposite from that used to increase the preload tension (or, in some cases, inserting an object into the cavity 62 to force spindle 60 towards knuckle 30 by a distance sufficient to disengage teeth 54/64 and allow spring 90 to essential unwind).

With reference to FIGS. 10, 11, 13, and 15, another optional feature that may be included in one or more embodiments of the self-closing hinges described herein is a slot and pin arrangement that can be used to limit the preload tension provided to the torsion spring 90 in the self-closing hinges described herein. Although depicted in FIGS. 11, 13, and 15, pin 22 is actually inserted into and retained within an aperture formed in knuckle 20 after assembly of the hinge components within the knuckles 20, 30, and 40.

Spindle 60 includes a slot 24 that extends about a portion of the circumference of the spindle 60. After assembly of the components within knuckle 20, pin 22 is inserted and positioned within slot 24 at an end associated with essentially no preload tension on torsion spring 90. As, however, spindle 60 is rotated to provide a desired level of preload to torsion spring 90 slot 24 rotates about hinge axis 11 such that the position of pin 22 moves within slot 24. Because slot 24 extends only about a portion of the circumference of spindle 60, rotation of the spindle 60 within knuckle 20 is limited when the rotation of spindle 60 reaches a point at which pin 22 acts against the opposite end of slot 24. As depicted in, e.g., FIGS. 11, 13, and 15, pin 22 is in slot 24 at a location corresponding to either no or minimal preload and rotation of spindle 60 about hinge axis 11 in the direction of arrow 61 depicted in FIG. 13 increases the preload of torsion spring 90, with the preload reaching its maximum allowed level when pin 22 reaches the leftmost end of slot 24 as seen in, e.g., FIG. 11.

Because spindle 60 moves along the hinge axis 11 during rotation of the spindle 60 about the hinge axis 11, the slot 24 may preferably, in one or more embodiments, have a slot height measured along the hinge axis 11 that is two or more times a pin height of the pin 22 also measured along the hinge axis 11. The larger slot height of the slot 24 provides clearance for the pin 22 as the spindle 60 moves along the length of the hinge axis 11.

As discussed herein, barrel 42 and leaf 16 move along hinge axis 11 to provide vertical adjustments. Optional cover 41 is provided over barrel 42 to improve the aesthetic appearance of the hinge 10. Although barrel 42 has a length (measured along hinge axis 11) that is less than the distance between the knuckles 20 and 30 that is sufficient to allow for the vertical adjustments described herein. In other words, the range of vertical adjustment is generally limited by the difference between the barrel length and the distance between knuckles 20 and 30—although other features may also reduce the allowable travel of barrel 42 (e.g., shoulder 78 on bushing 76, the minimum axial length of the biasing element 70, the depth of slot 68 on spindle 60, etc.).

The cover 41, for aesthetics, preferably has a cover length (also measured along hinge axis 11) that is, however, only slightly less than the distance between knuckles 20 and 30 to, e.g., cover as much of barrel 42 as possible. As a result, cover 41 is configured to slide along the outside of the barrel 42 as the vertical position of the barrel 42 is adjusted between knuckles 20 and 30. Although cover 41 is designed to move along barrel 42, it may be preferred that movement of the cover 41 be limited to, e.g., prevent rattling of the cover 41.

To inhibit, but not prevent movement of the cover 41 relative to the barrel 42, the depicted illustrative embodiment of the hinge includes interlocking/friction-enhancing features on the cover 41 and the central knuckle 40. Such features could be located at a variety of locations. In the depicted embodiment, the features are found on the lips 41-2 of the cover 41 and the leaf 16. In particular, the cover 41 includes lips 41-2 that extend away from the barrel 42 onto leaf 16. Lips 41-2 of the illustrative embodiment are depicted in, e.g., FIGS. 4-5, 7, and 9.

Figure 16:
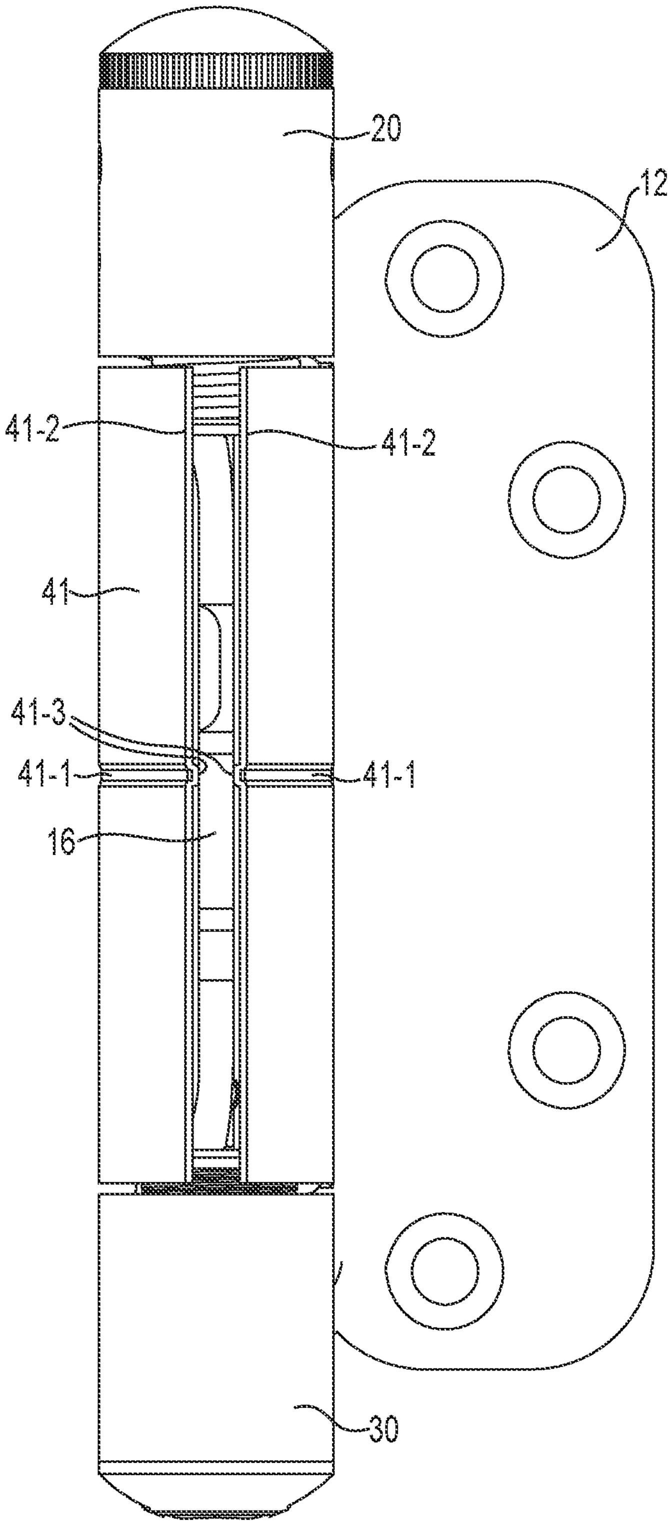
FIG. 16 is an enlarged view of the self-closing hinge depicting one illustrative embodiment of features provided on the cover to limit movement of the cover along the hinge axis.

With reference to FIG. 16 which is an enlarged view of the junction between the lips 41-2 and the leaf 16, protrusions 41-3 extending towards leaf 16 are provided on lips 41-2. Protrusions 41-3 preferably have, in one or more embodiments, the effect of increasing friction between the lips 41-2 and the leaf 16 at least because the protrusions 41-3 may concentrate the forces between the lips 41-2 and leaf 16. That increased friction preferably limits free movement of the cover 41 relative to the barrel 42.

To further increase the movement limiting forces, the leaf 16 of the depicted illustrative embodiment includes a complementary landing area 41-4 against which protrusions 41-3 bear. The landing area 41-4 may take a variety of forms some non-limiting examples of which include a roughened surface (e.g., etched, milled, stamped, etc.), protrusions, films/materials with a higher coefficient of friction than the surround surfaces of the leaf 16, etc.

Figure 17:
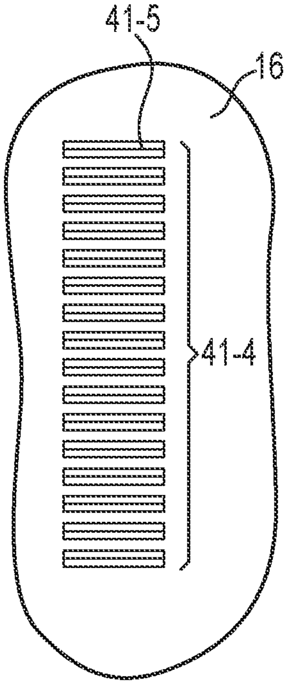
FIG. 17 depicts one illustrative embodiment of features provided on a leaf to limit movement of the cover depicted in FIG. 16.

FIG. 17 is an enlarged view of the landing area 41-4 provided on the leaf 16 of the depicted illustrative embodiment of hinge 10. The depicted landing are 41-4 includes series of depressions 41-5 formed into leaf 16 through, e.g., milling, etching, stamping, etc.). The depressions 41-5 may preferably be sized to receive at least a portion of the protrusions 41-3 on lips 41-2 of cover 41.

The various components used in the self-closing hinges described herein may be constructed of any suitable material or combination of materials including polymers, metals, composites, wood, ceramics, etc. The particular materials used need only perform the functions of the various components as described herein and suitable choices for the materials will be known to those of skill in the art.

The complete disclosure of the patents, patent documents, and publications identified herein are incorporated by reference in their entirety as if each were individually incorporated. To the extent there is a conflict or discrepancy between this document and the disclosure in any such incorporated document, this document will control.

Illustrative embodiments of self-closing door hinges, door systems incorporating the hinges, and related methods are discussed herein with some possible variations described. These and other variations and modifications in the invention will be apparent to those skilled in the art without departing from the scope of the invention, and it should be understood that this invention is not limited to the illustrative embodiments set forth herein. Accordingly, the invention is to be limited only by the claims provided below and equivalents thereof. It should also be understood that this invention also may be suitably practiced in the absence of any element not specifically disclosed as necessary herein.

The invention claimed is:

1. A self-closing hinge assembly comprising:

a first leaf configured to be attached to a first door system surface;

a second leaf configured to be attached to a second door system surface;

a first knuckle and a second knuckle, wherein the first knuckle and the second knuckle are attached to the first leaf and are aligned with each other along a hinge axis extending through the first knuckle and the second knuckle, and wherein the first knuckle and the second knuckle are spaced apart from each other along the hinge axis;

a central knuckle located between the first knuckle and the second knuckle, wherein the central knuckle is attached to the second leaf and aligned with the first knuckle and the second knuckle along the hinge axis;

a ratchet plug located in the first knuckle, the ratchet plug fixed in position relative to the first knuckle and the hinge axis, and wherein the ratchet plug comprises ratchet features facing the central knuckle;

a torsion spring located in the central knuckle, wherein the torsion spring comprises a first end proximate the first knuckle and a second end proximate the second knuckle;

a first spindle located between the first end of the torsion spring and the ratchet plug, wherein the first spindle comprises a spring end engaged with the first end of the torsion spring such that rotation of the first spindle about the hinge axis rotates the first end of the torsion spring about the hinge axis, and wherein the first spindle comprises a ratchet portion located in the first knuckle;

a biasing element located between the first end of the torsion spring and the ratchet portion of the first spindle, wherein the biasing element is configured to force the ratchet portion of the first spindle into engagement with the ratchet features on the ratchet plug, wherein the ratchet features of the ratchet plug and the ratchet portion of the first spindle, when engaged with each other, are configured to allow the first spindle to rotate about the hinge axis in one direction and to prevent rotation of the first spindle about the hinge axis in a direction opposite the one direction;

a screw located in the second knuckle, wherein the second knuckle and the screw comprise complementary threads such that rotation of the screw in a first direction about the hinge axis moves the screw along the hinge axis towards the first knuckle, and wherein rotation of the screw about the hinge axis in a second direction opposite the first direction moves the screw along the hinge axis away from the first knuckle; and a second spindle extending between the second end of the torsion spring and the screw, wherein the second spindle comprises a spring end located in the central knuckle and engaged with the second end of the torsion spring, and wherein the second spindle is fixed in position in the central knuckle relative to the hinge axis such that rotation of the second leaf in the second direction about the hinge axis relative to the first leaf acts against the torsion force applied to the second leaf of the hinge assembly by the torsion spring;

wherein rotation of the screw about the hinge axis in the first direction moves the second leaf along the hinge axis towards the first knuckle, and wherein rotation of the screw about the hinge axis in the second direction moves the second leaf along the hinge axis away from the first knuckle;

wherein the first spindle comprises a slot extending about a portion of the circumference of the first spindle proximate the ratchet portion of the first spindle, and wherein the first knuckle comprises a pin extending radially inward through the first knuckle into the slot, whereby rotation of the first spindle in the one direction is limited by a circumferential length of the slot.

2. An assembly according to claim 1, wherein rotation of the screw about the hinge axis in the first direction moves the second spindle and the second end of the torsion spring along the hinge axis towards the first knuckle.

3. An assembly according to claim 1, wherein rotation of the first spindle about the hinge axis in the one direction increases a torque force applied by the torsion spring to the second leaf.

4. An assembly according to claim 1, wherein the torsion spring comprises helical windings and a leg extending inward from the helical windings at the first end of the torsion spring, and wherein the first spindle comprises a slot configured to capture the leg such that rotation of the first spindle about the hinge axis in the one direction increases a torque force applied by the torsion spring to the second leaf.

5. An assembly according to claim 1, wherein rotation of the screw about the hinge axis in the first direction moves the torsion spring towards the first knuckle.

6. An assembly according to claim 1, wherein rotation of the first spindle about the hinge axis in the one direction compresses the biasing element along the hinge axis and moves the ratchet portion of the first spindle away from the ratchet plug.

7. An assembly according to claim 1, wherein the biasing element comprises a helically wound compression spring.

8. An assembly according to claim 7, wherein the biasing element is attached to the first spindle.

9. An assembly according to claim 7, wherein the assembly comprises a shoulder located on the first spindle, wherein the biasing element acts on the shoulder to force the ratchet portion into engagement with the ratchet features on the ratchet plug.

10. An assembly according to claim 1, wherein the slot comprises a slot height measured along the hinge axis, and wherein the slot height is two or more times a pin height of the pin measured along the hinge axis.

11. An assembly according to claim 1, wherein the second spindle comprises a stud extending away from the torsion spring along the hinge axis and wherein the screw comprises a stud cavity, wherein the stud is located in the stud cavity and wherein the stud rotates about the hinge axis within the stud cavity when the second leaf rotates about the hinge axis.

12. A self-closing hinge assembly comprising:

a first leaf configured to be attached to a first door system surface;

a second leaf configured to be attached to a second door system surface;

a first knuckle and a second knuckle, wherein the first knuckle and the second knuckle are attached to the first leaf and are aligned with each other along a hinge axis extending through the first knuckle and the second knuckle, and wherein the first knuckle and the second knuckle are spaced apart from each other along the hinge axis;

a central knuckle located between the first knuckle and the second knuckle, wherein the central knuckle is attached to the second leaf and aligned with the first knuckle and the second knuckle along the hinge axis;

a ratchet plug located in the first knuckle, the ratchet plug fixed in position relative to the first knuckle and the hinge axis, and wherein the ratchet plug comprises ratchet features facing the central knuckle;

a torsion spring located in the central knuckle, wherein the torsion spring comprises a first end proximate the first knuckle and a second end proximate the second knuckle;

a first spindle located between the first end of the torsion spring and the ratchet plug, wherein the first spindle comprises a spring end engaged with the first end of the torsion spring such that rotation of the first spindle about the hinge axis rotates the first end of the torsion spring about the hinge axis, and wherein the first spindle comprises a ratchet portion located in the first knuckle;

a biasing element located between the first end of the torsion spring and the ratchet portion of the first spindle, wherein the biasing element is configured to force the ratchet portion of the first spindle into engagement with the ratchet features on the ratchet plug, wherein the ratchet features of the ratchet plug and the ratchet portion of the first spindle, when engaged with each other, are configured to allow the first spindle to rotate about the hinge axis in one direction and to prevent rotation of the first spindle about the hinge axis in a direction opposite the one direction;

a screw located in the second knuckle, wherein the second knuckle and the screw comprise complementary threads such that rotation of the screw in a first direction about the hinge axis moves the screw along the hinge axis towards the first knuckle, and wherein rotation of the screw about the hinge axis in a second direction opposite the first direction moves the screw along the hinge axis away from the first knuckle; and a second spindle extending between the second end of the torsion spring and the screw, wherein the second spindle comprises a spring end located in the central knuckle and engaged with the second end of the torsion spring, and wherein the second spindle is fixed in position in the central knuckle relative to the hinge axis such that rotation of the second leaf in the second direction about the hinge axis relative to the first leaf acts against the torsion force applied to the second leaf of the hinge assembly by the torsion spring;

wherein rotation of the screw about the hinge axis in the first direction moves the second leaf along the hinge axis towards the first knuckle, and moves the second spindle and the second end of the torsion spring along the hinge axis towards the first knuckle;

wherein the torsion spring comprises helical windings and a leg extending inward from the helical windings at the first end of the torsion spring, and wherein the first spindle comprises a slot configured to capture the leg such that rotation of the first spindle about the hinge axis in the one direction increases a torque force applied by the torsion spring to the second leaf, wherein the slot comprises a depth extending along the hinge axis, and wherein rotation of the screw about the hinge axis in the first direction moves the leg of the torsion spring within the slot towards the first knuckle;

wherein the first spindle comprises a slot extending about a portion of the circumference of the first spindle proximate the ratchet portion of the first spindle, and wherein the first knuckle comprises a pin extending radially inward through the first knuckle into the slot, whereby rotation of the first spindle in the one direction is limited by a circumferential length of the slot.

13. An assembly according to claim 12, wherein rotation of the first spindle about the hinge axis in the one direction compresses the biasing element along the hinge axis and moves the ratchet portion of the first spindle away from the ratchet plug.

14. An assembly according to claim 12, wherein the biasing element comprises a helically wound compression spring attached to the first spindle.

15. An assembly according to claim 12, wherein the assembly comprises a shoulder located on the first spindle, wherein the biasing element acts on the shoulder to force the ratchet portion into engagement with the ratchet features on the ratchet plug.

16. An assembly according to claim 12, wherein the slot comprises a slot height measured along the hinge axis, and wherein the slot height is two or more times a pin height of the pin measured along the hinge axis.

17. An assembly according to claim 12, wherein the second spindle comprises a stud extending away from the torsion spring along the hinge axis and wherein the screw comprises a stud cavity, wherein the stud is located in the stud cavity and wherein the stud rotates about the hinge axis within the stud cavity when the second leaf rotates about the hinge axis.

18. An assembly according to claim 1, wherein the assembly comprises a cover positioned over the central knuckle, wherein the central knuckle is configured to move along the hinge axis within the cover.

19. A self-closing hinge assembly comprising:

a first leaf configured to be attached to a first door system surface;

a second leaf configured to be attached to a second door system surface;

a first knuckle and a second knuckle, wherein the first knuckle and the second knuckle are attached to the first leaf and are aligned with each other along a hinge axis extending through the first knuckle and the second knuckle, and wherein the first knuckle and the second knuckle are spaced apart from each other along the hinge axis;

a central knuckle located between the first knuckle and the second knuckle, wherein the central knuckle is attached to the second leaf and aligned with the first knuckle and the second knuckle along the hinge axis;

a ratchet plug located in the first knuckle, the ratchet plug fixed in position relative to the first knuckle and the hinge axis, and wherein the ratchet plug comprises ratchet features facing the central knuckle;

a torsion spring located in the central knuckle, wherein the torsion spring comprises a first end proximate the first knuckle and a second end proximate the second knuckle;

a first spindle located between the first end of the torsion spring and the ratchet plug, wherein the first spindle comprises a spring end engaged with the first end of the torsion spring such that rotation of the first spindle about the hinge axis rotates the first end of the torsion spring about the hinge axis, and wherein the first spindle comprises a ratchet portion located in the first knuckle;

a biasing element located between the first end of the torsion spring and the ratchet portion of the first spindle, wherein the biasing element is configured to force the ratchet portion of the first spindle into engagement with the ratchet features on the ratchet plug, wherein the ratchet features of the ratchet plug and the ratchet portion of the first spindle, when engaged with each other, are configured to allow the first spindle to rotate about the hinge axis in one direction and to prevent rotation of the first spindle about the hinge axis in a direction opposite the one direction;

a screw located in the second knuckle, wherein the second knuckle and the screw comprise complementary threads such that rotation of the screw in a first direction about the hinge axis moves the screw along the hinge axis towards the first knuckle, and wherein rotation of the screw about the hinge axis in a second direction opposite the first direction moves the screw along the hinge axis away from the first knuckle; and a second spindle extending between the second end of the torsion spring and the screw, wherein the second spindle comprises a spring end located in the central knuckle and engaged with the second end of the torsion spring, and wherein the second spindle is fixed in position in the central knuckle relative to the hinge axis such that rotation of the second leaf in the second direction about the hinge axis relative to the first leaf acts against the torsion force applied to the second leaf of the hinge assembly by the torsion spring;

wherein rotation of the screw about the hinge axis in the first direction moves the second leaf along the hinge axis towards the first knuckle, and wherein rotation of the screw about the hinge axis in the second direction moves the second leaf along the hinge axis away from the first knuckle;

wherein the assembly comprises a cover positioned over the central knuckle, wherein the central knuckle is configured to move along the hinge axis within the cover.

20. An assembly according to claim 19, wherein rotation of the screw about the hinge axis in the first direction moves the second spindle and the second end of the torsion spring along the hinge axis towards the first knuckle.

21. An assembly according to claim 19, wherein rotation of the first spindle about the hinge axis in the one direction increases a torque force applied by the torsion spring to the second leaf.

22. An assembly according to claim 19, wherein the torsion spring comprises helical windings and a leg extending inward from the helical windings at the first end of the torsion spring, and wherein the first spindle comprises a slot configured to capture the leg such that rotation of the first spindle about the hinge axis in the one direction increases a torque force applied by the torsion spring to the second leaf.

23. An assembly according to claim 22, wherein the slot comprises a depth extending along the hinge axis, and wherein rotation of the screw about the hinge axis in the first direction moves the leg of the torsion spring within the slot towards the first knuckle.

24. An assembly according to claim 19, wherein rotation of the screw about the hinge axis in the first direction moves the torsion spring towards the first knuckle.

25. An assembly according to claim 19, wherein rotation of the first spindle about the hinge axis in the one direction compresses the biasing element along the hinge axis and moves the ratchet portion of the first spindle away from the ratchet plug.

26. An assembly according to claim 19, wherein the biasing element comprises a helically wound compression spring attached to the first spindle.

27. An assembly according to claim 19, wherein the second spindle comprises a stud extending away from the torsion spring along the hinge axis and wherein the screw comprises a stud cavity, wherein the stud is located in the stud cavity and wherein the stud rotates about the hinge axis within the stud cavity when the second leaf rotates about the hinge axis.

* * * * *